(12) United States Patent
Oglesbee

(10) Patent No.: US 6,674,273 B2
(45) Date of Patent: Jan. 6, 2004

(54) FILTERING CIRCUIT AND BATTERY PROTECTION CIRCUIT USING SAME

(75) Inventor: John Wendell Oglesbee, Watkinsville, GA (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 10/260,782

(22) Filed: Sep. 28, 2002

(65) Prior Publication Data

US 2003/0155895 A1 Aug. 21, 2003

Related U.S. Application Data

(63) Continuation-in-part of application No. 10/077,355, filed on Feb. 15, 2002.
(60) Provisional application No. 60/357,172, filed on Feb. 15, 2002.

(51) Int. Cl.[7] .............................. G05F 1/40; G05F 1/56
(52) U.S. Cl. ...................................... 323/284; 323/274
(58) Field of Search ................................ 323/268, 269, 323/271–277, 279, 282, 284–287, 289

(56) References Cited

U.S. PATENT DOCUMENTS

| | | | | |
|---|---|---|---|---|
| 4,885,522 A | * | 12/1989 | Konopka | ..................... 320/145 |
| 5,744,939 A | * | 4/1998 | Leppo | ......................... 320/153 |
| 6,441,594 B1 | * | 8/2002 | Connell et al. | .............. 323/274 |
| 6,492,792 B1 | * | 12/2002 | Johnson, Jr. et al. | ........ 320/136 |
| 6,559,623 B1 | * | 5/2003 | Pardoen | ...................... 323/274 |

* cited by examiner

Primary Examiner—Matthew V. Nguyen
(74) Attorney, Agent, or Firm—Philip H. Burrus, IV

(57) ABSTRACT

This invention includes an improvement to a power regulation and thermal management circuit. The power regulation and thermal management circuit includes a pass element coupled serially between a power source and a load. A voltage sensing circuit senses the voltage across the serial element and selects a corresponding current path based upon the sense voltage from a plurality of current paths. The invention includes a filtering circuit coupled serially between the voltage sensing circuit and the plurality of current paths to reduce noise on the sensed pass element voltage. The power regulation and thermal management circuit also includes a linear regulator to terminate charging at the appropriate voltage. The invention includes a peak detection circuit with the linear regulator to reduce noise caused by, for example, a pulsing load during charging.

9 Claims, 6 Drawing Sheets

FILTERING CIRCUIT AND BATTERY PROTECTION CIRCUIT USING SAME

CROSS-REFERENCE TO RELATED APPLICATIONS

This application is a continuation in part from U.S. application Ser. No. 10/077,355, filed Feb. 15, 2002, entitled "Power Regulation and Thermal Management Circuit and Method", the disclosures of which, including all attached documents and appendices, are incorporated by reference in their entirety for all purposes.

This application claims the benefit of priority from U.S. Provisional Application Ser. No. 60/357,172, filed Feb. 15, 2002, entitled "Battery Charging and Protection Circuit", the disclosures of which, including all attached documents and appendices, are incorporated by reference in their entirety for all purposes.

BACKGROUND

1. Technical Field

This invention relates generally to thermal regulation circuits for power dissipating electronic circuit elements, and more specifically to power regulation and thermal management for power transistors as, for example, in battery charging applications.

2. Background Art

FIG. 1 illustrates a simple battery charger 100 that is well known in the art. The charger 100 consists of a power supply 101, a linear regulator 102, a pass element 103 and a battery cell 104. The power supply 101 provides voltage and current to the battery cell 104. The voltage and current must be regulated by the pass element 103 so as to avoid charging the battery cell 104 too rapidly. The linear regulator 102 performs this regulation by dissipating as heat the difference between the power generated by the power supply 101 and the power stored by the battery cell 104.

The problem with this prior art solution is that the pass element 103 can overheat. This is best explained by way of example. For a typical single-cell, lithium battery application, a fully charged battery cell 104 typically registers about 4.1 volts. Thus, to fully charge the battery cell 104, and to give enough headroom for parasitic power losses in the pass element 103 and connecting circuitry, the power supply must be capable of supplying at least 5 volts. A typical battery cell 104 will charge optimally at a current of roughly 1 amp.

The problem arises with the battery cell 104 is fully discharged. A discharged battery cell 104 may register only 2 volts. As the power supply 101 would supply energy at a rate of 5 volts at 1 amp, or 5 watts, and the battery cell 104 stores energy at a rate of 2 volts at 1 amp, or 2 watts, the pass element 103 must dissipate energy at a rate of 3 watts. As typical pass elements 103 may come in a TO-220package, 3 watts for extended periods of time may make the pass element 103 quite warm. Extended periods of heat my actually jeopardize reliability by approaching—or surpassing—the threshold junction temperature of the pass element 103.

The problem is exacerbated when an incompatible power supply 101 is coupled to the circuit. For example, if someone accidentally couples a 12-volt supply to the charger, the pass element 103 may have to dissipate 10 watts! This can eventually lead to thermal destruction of the pass element 103.

One solution to this problem is recited in U.S. Pat. No. 5,815,382, issued to Saint-Pierre et al. entitled "Tracking Circuit for Power Supply Output Control". This solution provides a means of reducing the output voltage of a power supply when the battery is in a discharged state, thereby reducing the total output power of the power supply. This, in turn, reduces the amount of power a pass element would need to dissipate.

While this is a very effective solution to the problem, it requires a power supply that both includes a feedback input and is responsive to the input by changing the output voltage. The electronics associated with an adjustable power supply can be more expensive that those found is a simple linear transformer power supply.

There is thus a need for an improved means of regulating temperature in a power-dissipating element like those employed as pass elements in battery charging applications.

DETAILED DESCRIPTION OF THE INVENTION

Figure 1:
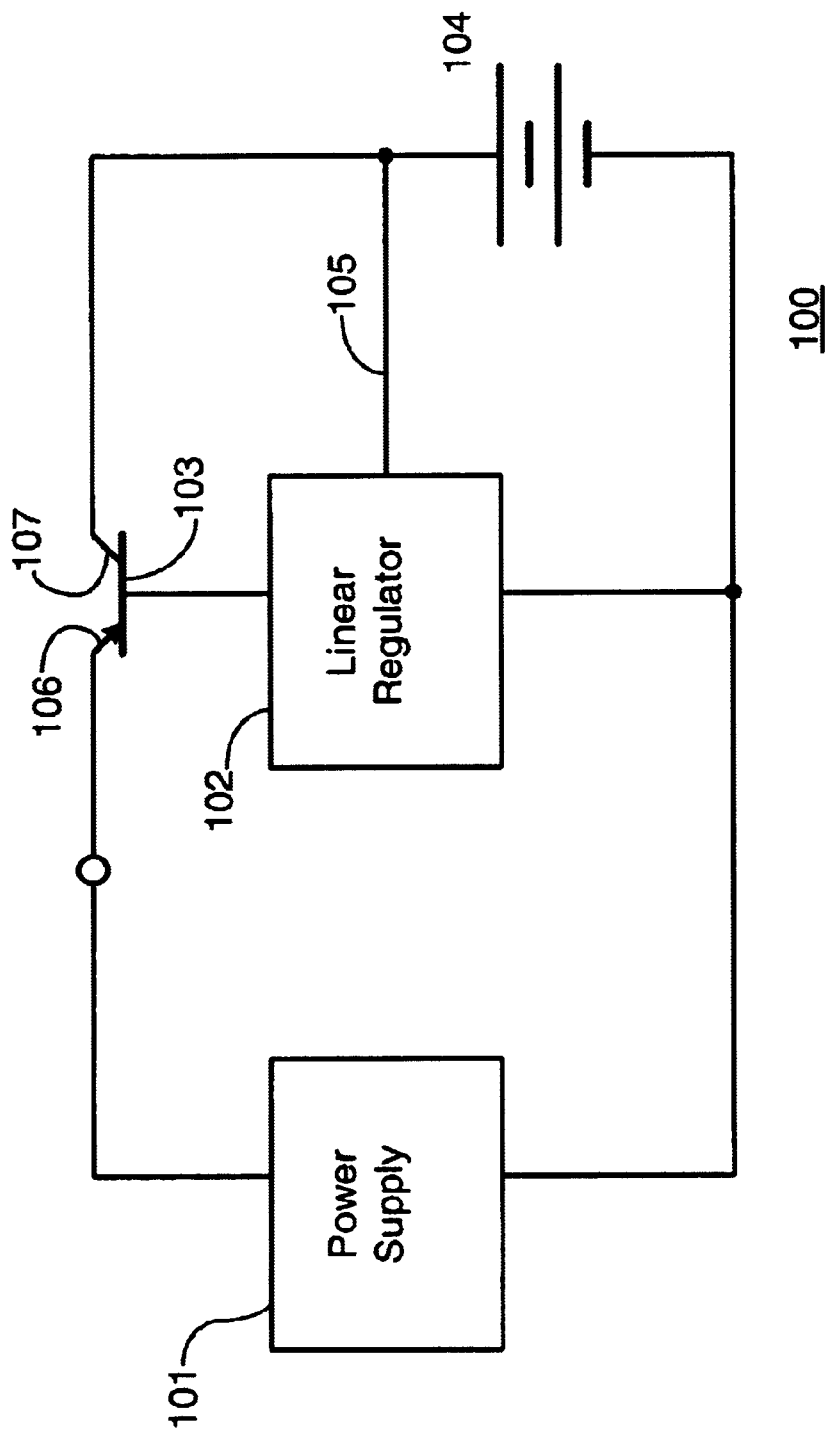
FIG. 1 is an illustration of a prior art charging circuit.

A preferred embodiment of the invention is now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on."

The parent application, U.S. patent application Ser. No. 10/077,355, filed Feb. 15, 2002, incorporated herein by reference, teaches the power regulation and thermal management circuit shown in FIG. 3. The present invention offers an improvement to the circuit of FIG. 3.

Figure 3:
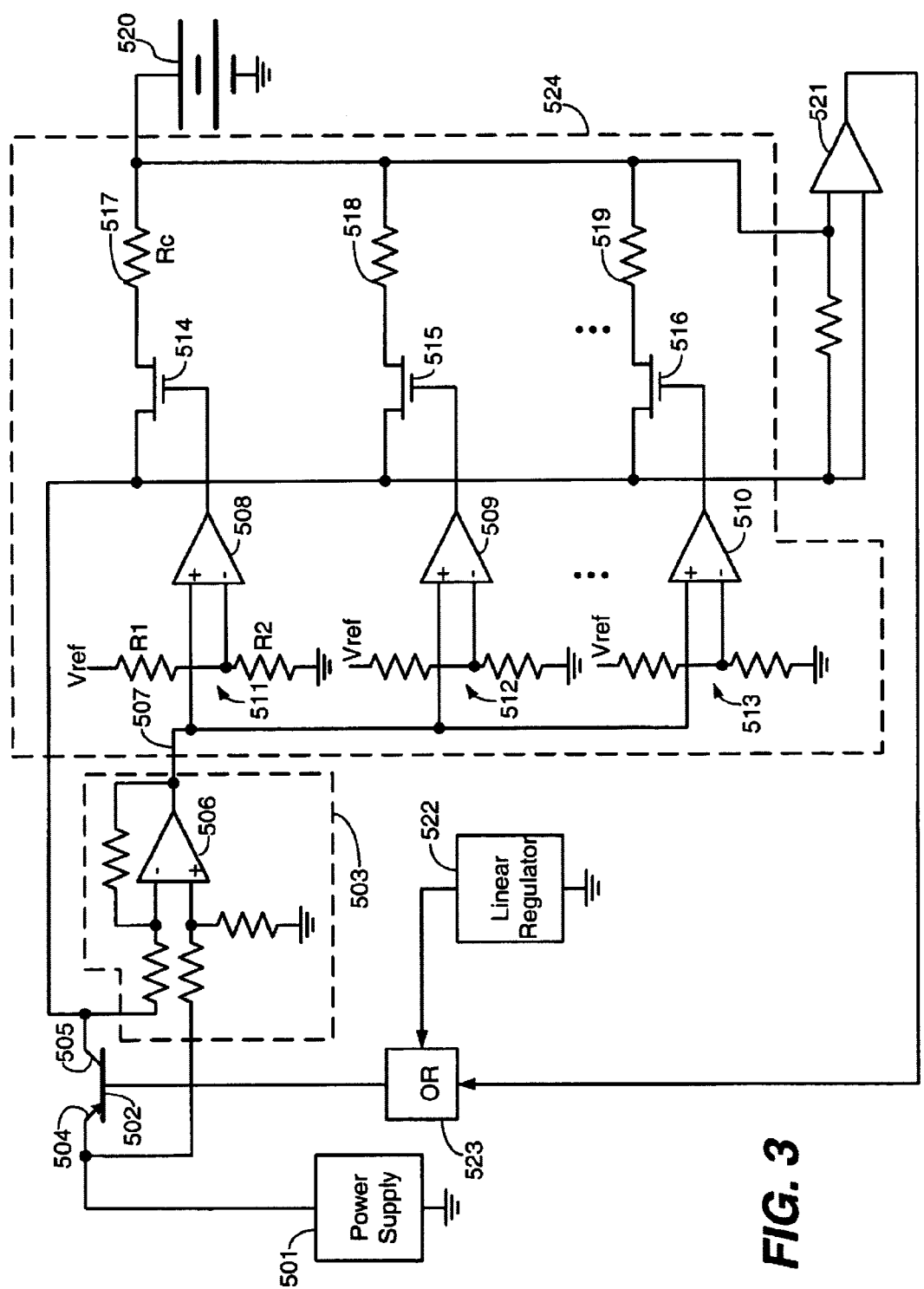
FIG. 3 is a schematic diagram in accordance with the invention.
Figure 4:
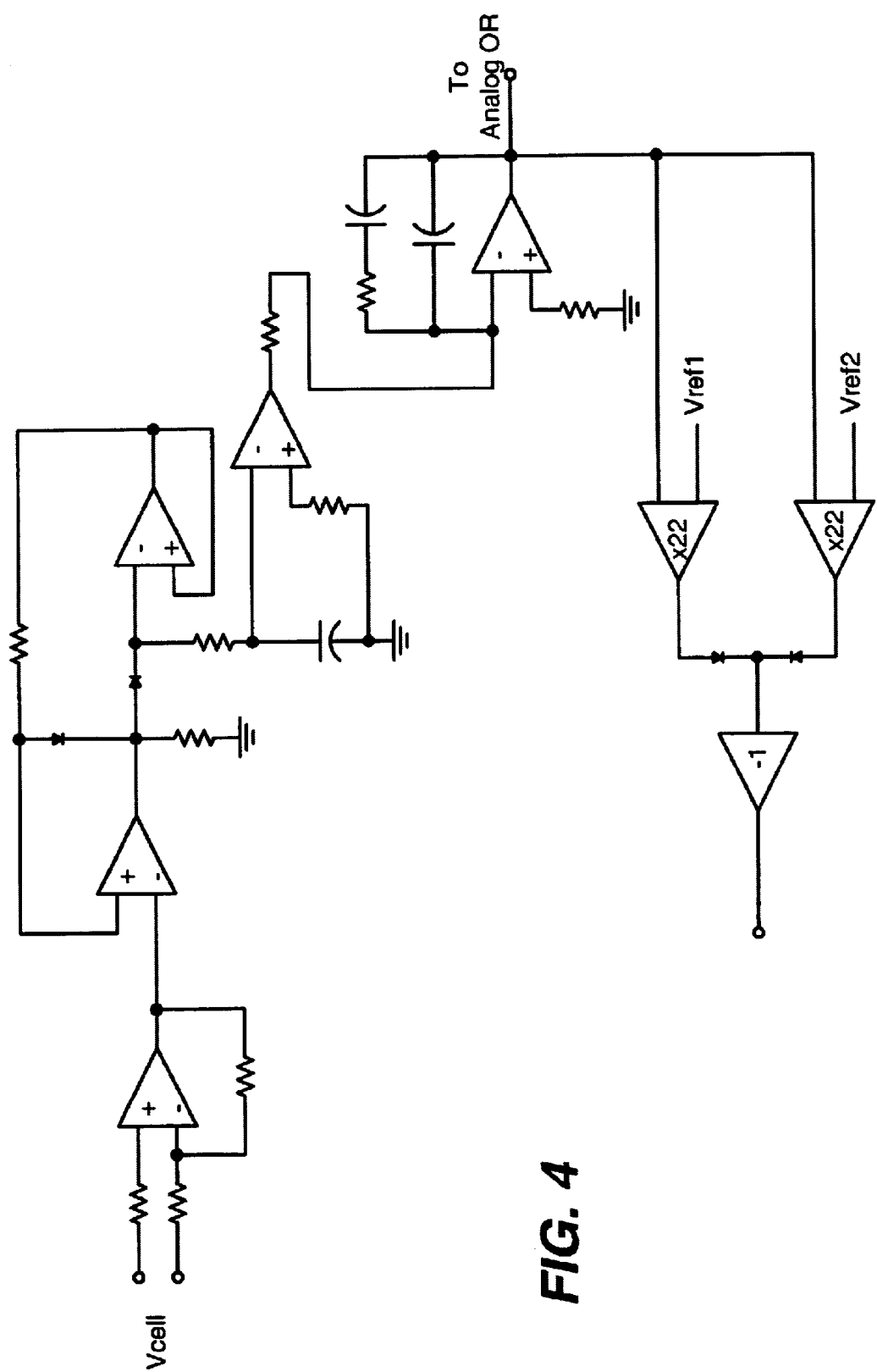
FIG. 4 is a schematic diagram of a preferred embodiment of a linear regulator in accordance with the invention.

Referring now to FIG. 3, a power supply 501 provides power to the circuit. The power supply 501 may be any of a number of power supply types, including but not limited to constant-current-constant-voltage (CCCV) and linear transformers. The power supply 501 is coupled to a pass element 502. In this preferred embodiment the pass element is a PNP bipolar junction transistor, although a large number of other types of pass elements may be substituted. The pass element 502 in this embodiment includes an emitter 504 and a collector 505.

A voltage sensing circuit 503 senses the voltage from collector 505 to emitter 504 (Vce). In one preferred embodiment, the voltage sensing circuit includes an op-amp 506 with a preset gain. The voltage sensing circuit 503 delivers a voltage output 507 that is proportional to Vce to a current switching network 524. The voltage output 507 is coupled to a plurality of comparators 508, 509, 510 in the current switching network 524, each comparator having a distinct reference voltage 511, 512, 513. The reference voltages 511, 512, 513 are easily set by resistor dividers. The number of comparators and corresponding reference voltages depends upon the resolution desired. It will be clear to those of ordinary skill in the art that the number of comparators may vary by application. It will also be obvious that the voltage references may be set in linear intervals, e.g. Vref, Vref*2, Vref*3, etc., as well as in non-linear intervals, e.g. Vref, Vref*a, Vref*b, etc.

A particular comparator will be selected based upon the level of the voltage sense output 507. Once actuated, the comparator will turn on a corresponding current switching transistor 514, 515, 516. The particular current switch transistor then couples the charging current through a current sensing resistor 517, 518, 519. The resultant current then flows through the cell 520.

The current is regulated by the current regulator 521, which in turn provides feedback to the pass element 502 to reduce or increase current accordingly. This is accomplished by comparing the voltage generated by current flowing through the current sensing resistors 517, 518, 519 to a reference by way of the current regulator 521. The values of the current sensing resistors 517, 518, 519, will of course have different values, each corresponding to a different level of current that should be allowed by the current regulator 521. The current regulator 521 then couples feedback to the pass element 502 to reduce current when the pass element 502 is in jeopardy of thermal breakdown. In this manner, the circuit facilitates charging at a constant power level (with respect to the pass element 502) by reducing current based upon the voltage across the pass element 502. The circuit is actuated in the danger zones, i.e. where Vce*Ichg is too large.

Note that the current regulator 521 is dominantly analog "OR" coupled with a conventional linear regulator 522. The OR connection 523 allows the current regulator to override the conventional linear regulator 522 when the pass element 502 is in a danger zone. At other, safe operating ranges, the pass element 502 is allowed to remain saturated to allow maximum charge current to flow in accordance with the conventional linear regulator 522.

The present invention offers an improvement to this circuit by processing the voltage output 507 that is proportional to Vce. This processing is preferably accomplished by way of a filtering circuit coupled serially between the voltage output 507 and the current switching circuit 524. One preferred embodiment of such a filtering circuit is a low pass filter.

Figure 5:
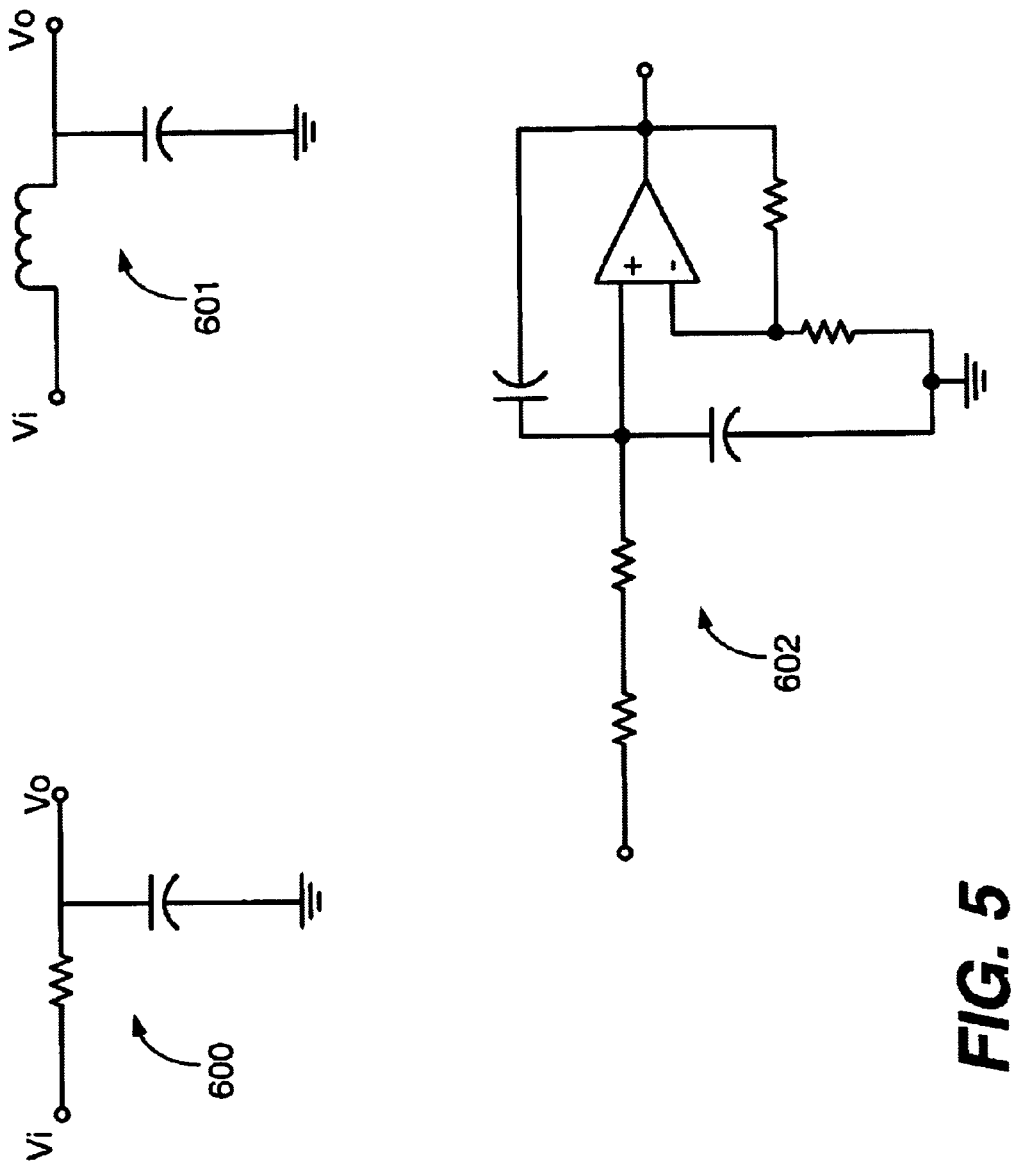
FIG. 5 illustrates three exemplary filtering circuits.

Referring now to FIG. 5, illustrated therein are three possible types of low pass filters: a first order R-C filter 600, a second order L-C filter 601, and a second order active low pass filter 602. It will be clear to those of ordinary skill in the art that the invention is not limited to the filters shown in FIG. 6. For example, a microprocessor that periodically sampled the voltage output might digitally filter the signal by averaging. It will be obvious to those of ordinary skill in the art that any order of filtering circuits may be substituted to perform the function of the filtering circuits of FIG. 6.

Figure 6:
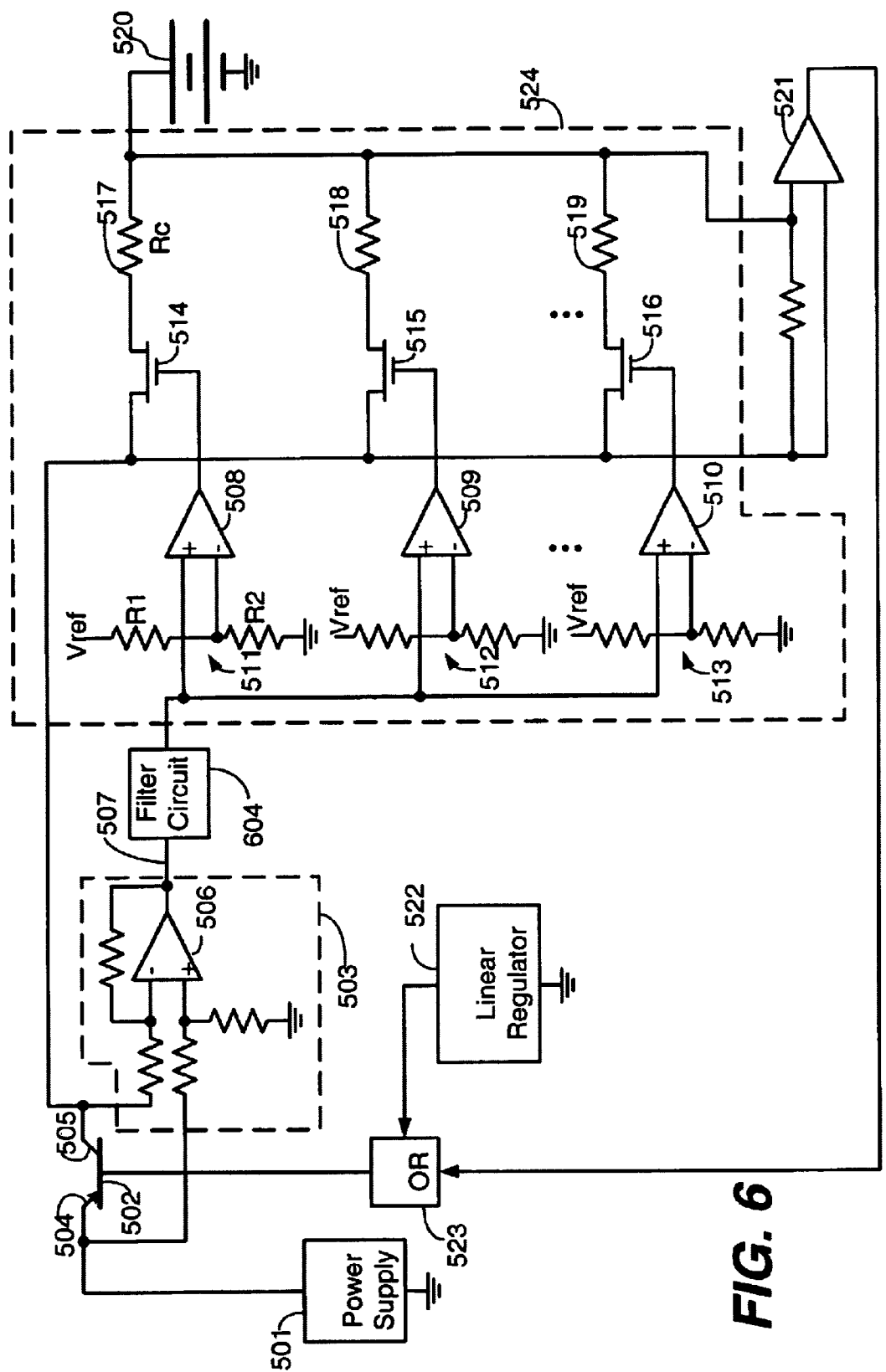
FIG. 6 is a schematic diagram like that of FIG. 3, but with a filtering circuit coupled serially between the voltage output and the current switching circuit.

Referring now to FIG. 6, illustrated therein is the circuit of FIG. 3 with the filtering circuit 604 coupled serially between the voltage output 507 and the current switching circuit 524. The purpose of the filtering circuit 604 is to "smooth out" the voltage output 507, which may contain various periodic noise components. These noise components can interfere with proper power management circuit operation. One example of such a noise component is the line voltage ripple associated with many rectified-transformer power supplies. The filtering circuit 604 excludes ripple from reaching the current switching circuit 524, while maintaining a useful signal representative of the voltage output 507.

Figure 2:
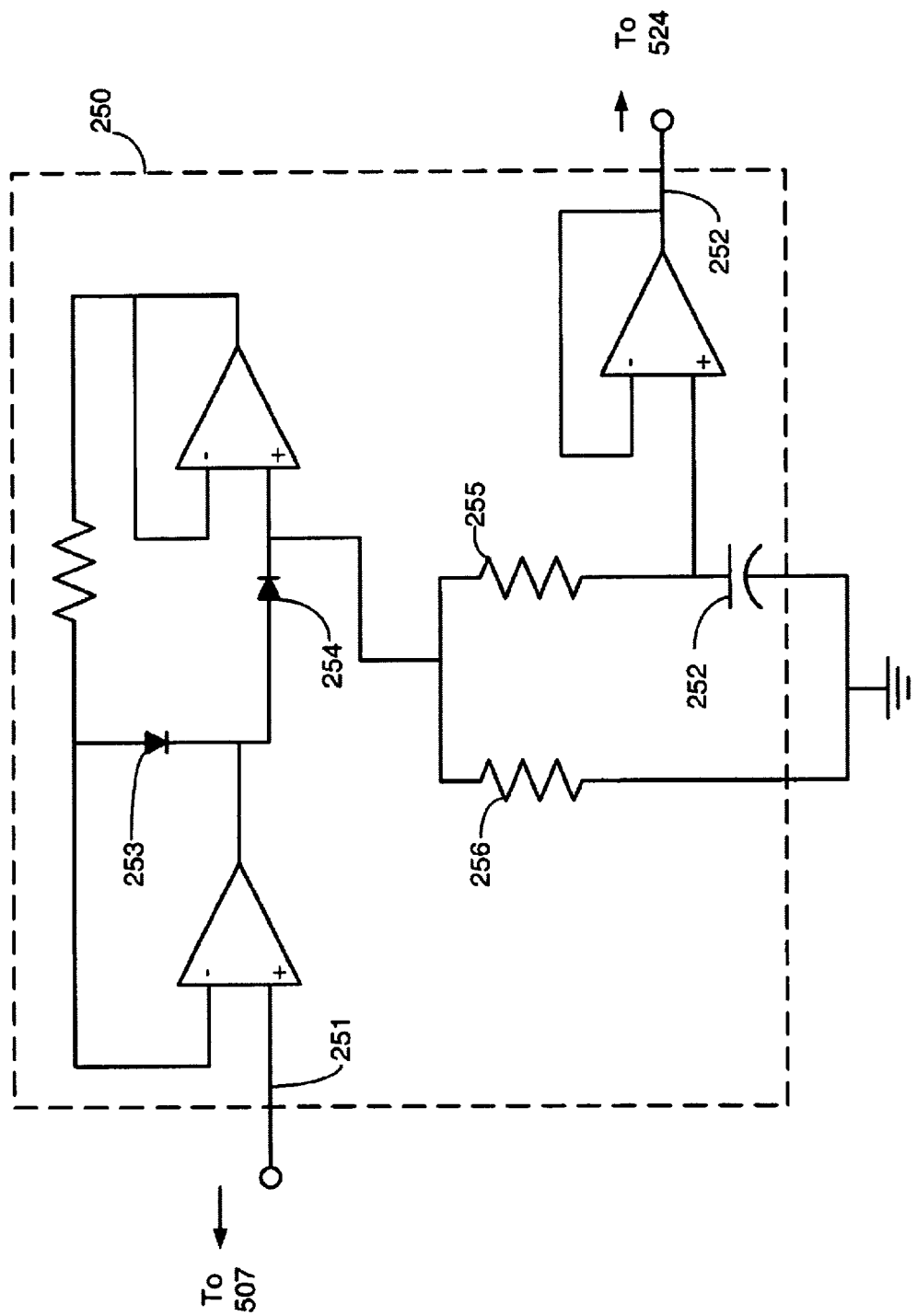
FIG. 2 is a peak detection circuit in accordance with the invention.

Another preferred embodiment of a filtering circuit is shown in FIG. 2. Referring now to FIG. 2, illustrated therein is a peak detection circuit 250 having an input 251 coupled from the voltage output 507 of FIG. 3, and an output 252 coupled to the current switching circuit 524 of FIG. 3. The peak detection circuit 250, in essence, "remembers" the peak value of the input 251. The peak detection circuit 250 is characterized by a fast positive slew rate for increasing input 251 signals, and a slow decay rate that holds the maximum value of the input 251 signal when it is decreasing.

The maximum value of the input 251 is stored by capacitor 252, and the switching of diodes 253 and 254 alternatively enables the positive slew and decay rates, depending on whether the input 251 is greater or less than the voltage stored by capacitor 252. Resistor 255 and capacitor 252 establish the positive slew rate. Resistor 256, in conjunction with capacitor 252, sets the decay rate.

Referring again to FIG. 3, recall that purpose of the linear regulator 522 is sensing the voltage of the cell 520 and terminating charging when the cell 520 reaches its termination voltage. In effect, the linear regulator 522 provides the mechanism for controlling voltage across the cell 520 by regulating the maximum charging voltage.

It is advantageous to couple a peak detection circuit serially between the cell 520 and the linear regulator 522. (Note that by way of example, such a peak detection circuit could be coupled serially between the cell 104 and the linear regulator 102 of FIG. 1.) For example, if the cell 520 is subject to a periodically pulsing load during charging, such load pulses may distort the cell 520 voltage sensed by the linear regulator and ultimately fed to the pass element 502. This occurs because the load pulses modulate the cell 520 voltage by a magnitude related to the internal impedance of the cell 520.

Distortions in the cell 520 voltage can cause the linear regulator 522 to respond to the average value of the terminal voltage (as opposed to the actual value) as it is being modulated. If the linear regulator 522 forces the average cell 520 voltage to be equal to the termination voltage, and if the actual cell 520 voltage contains an AC load component, then the peak cell 520 voltage can exceed the termination voltage. This condition can cause the cell 520 to be overcharged, thereby compromising reliability. To prevent this condition, a peak detection circuit is included serially between the cell 520 and the linear regulator 522. If there is an AC component on the actual cell 520 voltage (due to load modulation), the peak detection circuit "tricks" the linear regulator 522 into regulating the peak cell voltage rather than the average cell voltage. The result is that the cell 520 does not become overcharged, even with an AC load voltage component present.

While the preferred embodiments of the invention have been illustrated and described, it is clear that the invention is not so limited. Numerous modifications, changes, variations, substitutions, and equivalents will occur to those skilled in the art without departing from the spirit and scope of the present invention as defined by the following claims. For example, while the peak detection circuit is recited herein as an analog circuit comprising operational amplifiers, it could also be made using digital logic circuits or low pass filters.

What is claimed is:

1. A circuit for maintaining constant power dissipation in a series element, the circuit comprising:
   a. a power source input;
   b. a load output;
   c. at least one series element coupled serially between the power source input and the load output;
   d. a means for sensing a voltage across the series element;
   e. a parallel connection of a plurality of current sensing elements, the parallel connection being coupled serially between the power source input and the load output;
   f. a means of selecting at least one of the plurality of current sensing elements, wherein the selection corresponds to a voltage sensed by the means for sensing voltage across the series element; and
   g. a filtering circuit coupled serially between the means for sensing a voltage across the series element and the means of selecting at least one of the plurality of current sensing elements.

2. The circuit of claim 1, further comprising a means for providing a feedback signal to the series element, the feedback signal corresponding to the selection of one of the plurality of current sensing elements.

3. The circuit of claim 2 wherein the filtering circuit is selected from the group consisting of passive low pass filters, digital low pass filters and active low pass filters.

4. The circuit of claim 3 wherein the means for sensing the voltage across the series element comprises an amplifier having an output signal, the output signal being of a voltage that is proportional to the voltage across the series element.

5. The circuit of claim 4, wherein the means of selecting one of the plurality of current sensing elements comprises a plurality of comparators coupled to the output signal, each comparator having a corresponding reference voltage, such that the comparator is selected when the output signal exceeds the corresponding reference voltage.

6. The circuit of claim 5, wherein the means of selecting one of the plurality of current sensing elements selects at least one current sensing element such that the feedback signal to the series element causes power dissipated in the series element to remain below a predetermined threshold.

7. The circuit of claim 1, further comprising an analog OR gate coupled serially between a parallel connection of a plurality of current sensing elements and the at least one series element.

8. The circuit of claim 7, further comprising a linear regulator coupled to the analog OR gate.

9. The circuit of claim 8, further comprising a peak detection circuit coupled serially between the load output and linear regulator.

* * * * *